US012696324B2

(12) United States Patent
Ly et al.

(10) Patent No.: US 12,696,324 B2
(45) Date of Patent: Jul. 28, 2026

(54) PHYSICAL RANDOM ACCESS CHANNEL OCCASIONS FOR TRANSMITTING PHYSICAL UPLINK SHARED CHANNEL REPETITION REQUESTS

(71) Applicant: QUALCOMM Incorporated, San Diego, CA (US)

(72) Inventors: Hung Dinh Ly, San Diego, CA (US); Kexin Xiao, Shanghai (CN); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 18/549,269

(22) PCT Filed: May 11, 2022

(86) PCT No.: PCT/CN2022/092132
§ 371 (c)(1),
(2) Date: Sep. 6, 2023

(87) PCT Pub. No.: WO2022/237818
PCT Pub. Date: Nov. 17, 2022

(65) Prior Publication Data
US 2024/0147546 A1 May 2, 2024

(30) Foreign Application Priority Data
May 11, 2021 (WO) ................ PCT/CN2021/093086

(51) Int. Cl.
*H04W 74/0836* (2024.01)
*H04L 1/1867* (2023.01)
(Continued)

(52) U.S. Cl.
CPC ......... *H04W 74/0836* (2024.01); *H04L 1/189* (2013.01); *H04L 5/0053* (2013.01); *H04W 74/0838* (2024.01)

(58) Field of Classification Search
CPC . H04W 74/0833; H04W 72/23; H04W 74/00; H04W 76/20; H04L 1/00
See application file for complete search history.

(56) References Cited

U.S. PATENT DOCUMENTS

2020/0288506 A1    9/2020  Lei et al.
2023/0262690 A1 *  8/2023  Medina Acosta ..... H04L 1/1671
                                                  370/329

(Continued)

FOREIGN PATENT DOCUMENTS

CN      110113732 A    8/2019
EP        3780871 A1    2/2021
WO    2021034084 A1    2/2021

OTHER PUBLICATIONS

Ericsson: "Analysis of Random Access Requirements in NB-Iot", 3GPP TSG RAN WG4 Meeting #78bis, R4-161946, San Jose del Cabo, Mexico, Apr. 11-15, 2016, Apr. 26, 2016 (Apr. 26, 2016) Section 2, pp. 1-5.

(Continued)

*Primary Examiner* — Iqbal Zaidi
(74) *Attorney, Agent, or Firm* — Harrity & Harrity, LLP

(57) ABSTRACT
Various aspects of the present disclosure generally relate to wireless communication. In some aspects, a user equipment (UE) may transmit a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH
(Continued)

600 ➤

700 ➤

610 ~ Transmit a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure 620 ~ Transmit at least one PUSCH repetition associated with the RRC connection request message based at least in part on the request 710 ~ Receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure 720 ~ Receive at least one PUSCH repetition associated with the RRC connection request message based at least in part on the request message includes a request for physical uplink shared channel (PUSCH) repetition corresponding to a radio resource control (RRC) connection request message of the four-step RACH procedure. The UE may transmit at least one PUSCH repetition associated with the RRC connection request message based at least in part on the request. Numerous other aspects are described.

30 Claims, 9 Drawing Sheets

(51) Int. Cl.
H04L 5/00 (2006.01)
H04W 74/0838 (2024.01)

(56) References Cited

U.S. PATENT DOCUMENTS

2023/0371081 A1* 11/2023 Ali ................... H04W 74/0833
2024/0032103 A1* 1/2024 Rastegardoost .. H04W 74/0833

OTHER PUBLICATIONS

Huawei et al., "Discussion on Msg3 Repetition for Coverage Enhancement", 3GPP TSG RAN WG1 Meeting #104bis-e, R1-2102315, E-meeting, Apr. 12-Apr. 20, 2021, 6 Pages, Section 2.

International Search Report and Written Opinion—PCT/CN2021/093086—ISA/EPO—Feb. 10, 2022.
International Search Report and Written Opinion—PCT/CN2022/092132—ISA/EPO—Aug. 16, 2022.
Nokia, et al., "2-Step RACH Procedure Feature Lead Summary-Update 3", 3GPP Draft, R1-1905874, 3GPP TSG RAN WG1 #96bis, 2-Step RACH Procedure Feature Lead Summary RAN1#96B#3, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 15, 2019 (Apr. 15, 2019), XP051707918, 96 pages, Sects 7-9, Section 2.5.
Qualcomm Incorporated: "Summary of Remaining Details on RACH Procedure", 3GPP TSG-RAN WG1 93, R1-1807633, Busan, Korea, May 21-May 25, 2018, 22 Pages.
Huawei et al., "Discussion on Msg3 Repetition for Coverage Enhancement", 3GPP TSG RAN WG1 Meeting #104bis-e, R1-2102315, vol. RAN WG1, No. E-meeting, Apr. 12, 2021-Apr. 20, 2021, XP052177035, Apr. 7, 2021, 6 Pages, The whole document.
Supplementary European Search Report—EP22806781—Search Authority—The Hague—Jan. 29, 2025.
Vivo: "Discussion on Type A PUSCH Repetition for Msg3", 3GPP TSG RAN WG1 #104-e, R1-2100461, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970383, 7 Pages, The Whole Document.

* cited by examiner

500

515
At least one PUSCH repetition

510
PRACH message

505
PRACH indications and/or
configuration

UE
120

BS
110

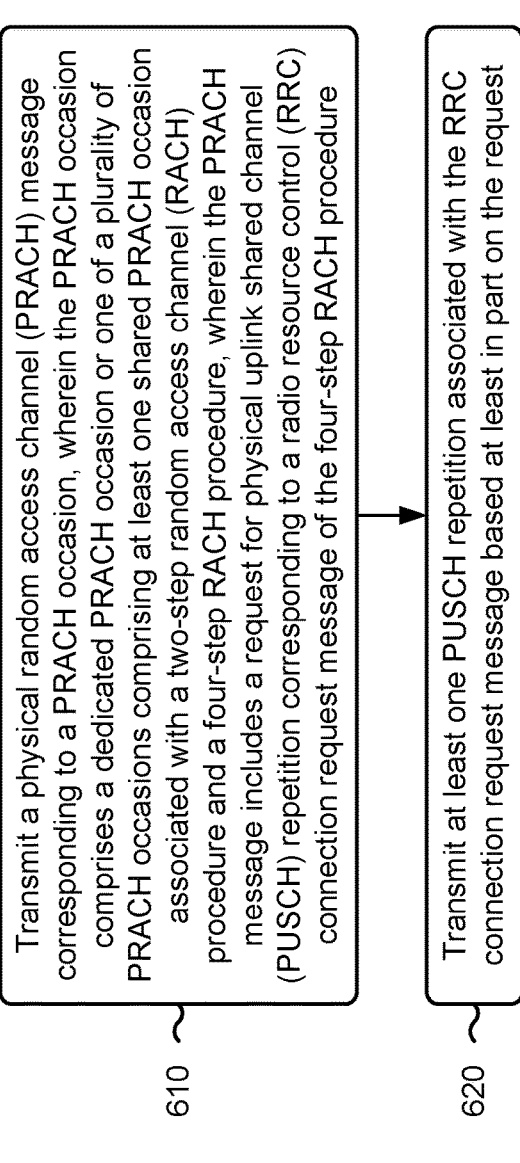

610

Transmit a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure

620

Transmit at least one PUSCH repetition associated with the RRC connection request message based at least in part on the request

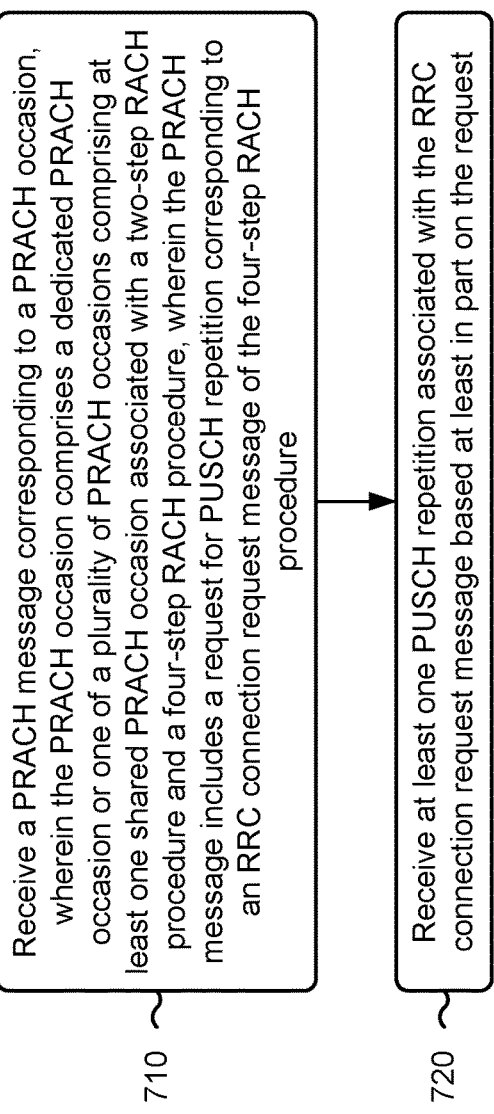

Receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure

710

Receive at least one PUSCH repetition associated with the RRC connection request message based at least in part on the request

PHYSICAL RANDOM ACCESS CHANNEL OCCASIONS FOR TRANSMITTING PHYSICAL UPLINK SHARED CHANNEL REPETITION REQUESTS

CROSS-REFERENCE TO RELATED APPLICATIONS

This Patent Application is a 371 national stage of PCT Application No. PCT/CN2022/092132, filed on May 11, 2022, entitled "PHYSICAL RANDOM ACCESS CHAN-NEL OCCASIONS FOR TRANSMITTING PHYSICAL UPLINK SHARED CHANNEL REPETITION REQUESTS," which claims priority to Patent Cooperation Treaty (PCT) Patent Application No. PCT/CN2021/093086, filed on May 11, 2021, entitled "PHYSICAL RANDOM ACCESS CHANNEL OCCASIONS FOR TRANSMIT-TING PHYSICAL UPLINK SHARED CHANNEL REP-ETITION REQUESTS," and assigned to the assignee hereof. The disclosures of the prior Applications are con-sidered part of and are incorporated by reference into this Patent Application.

FIELD OF THE DISCLOSURE

Aspects of the present disclosure generally relate to wireless communication and to techniques and apparatuses for physical random access channel occasions for transmit-ting physical uplink shared channel repetition requests.

BACKGROUND

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier fre-quency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile stan-dard promulgated by the Third Generation Partnership Proj-ect (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promul-gated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broad-band access continues to increase, further improvements in LTE, NR, and other radio access technologies remain useful.

SUMMARY

In some aspects, a user equipment (UE) for wireless communication includes a memory and one or more pro-cessors, coupled to the memory, configured to: transmit a physical random access channel (PRACH) message corre-sponding to a PRACH occasion, wherein the PRACH occa-sion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure; and transmit at least one PUSCH repetition associated with the RRC connection request message based at least in part on the request.

In some aspects, a base station for wireless communica-tion includes a memory and one or more processors, coupled to the memory, configured to: receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and receive at least one PUSCH repetition associated with the RRC connection request mes-sage based at least in part on the request.

In some aspects, a method of wireless communication performed by a UE includes transmitting a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and transmitting at least one PUSCH repetition associated with the RRC connection request message based at least in part on the request.

In some aspects, a method of wireless communication performed by a base station includes receiving a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and receiving at least one PUSCH repetition associated with the RRC connection request message based at least in part on the request.

In some aspects, a non-transitory computer-readable medium storing a set of instructions for wireless communication includes one or more instructions that, when executed by one or more processors of a UE, cause the UE to: transmit a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and transmit at least one PUSCH repetition associated with the RRC connection request message based at least in part on the request.

In some aspects, a non-transitory computer-readable medium storing a set of instructions for wireless communication includes one or more instructions that, when executed by one or more processors of a base station, cause the base station to: receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and receive at least one PUSCH repetition associated with the RRC connection request message based at least in part on the request.

In some aspects, an apparatus for wireless communication includes means for transmitting a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and means for transmitting at least one PUSCH repetition associated with the RRC connection request message based at least in part on the request.

In some aspects, an apparatus for wireless communication includes means for receiving a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and means for receiving at least one PUSCH repetition associated with the RRC connection request message based at least in part on the request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes associated with PRACH occasions for transmitting PUSCH repetition requests, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
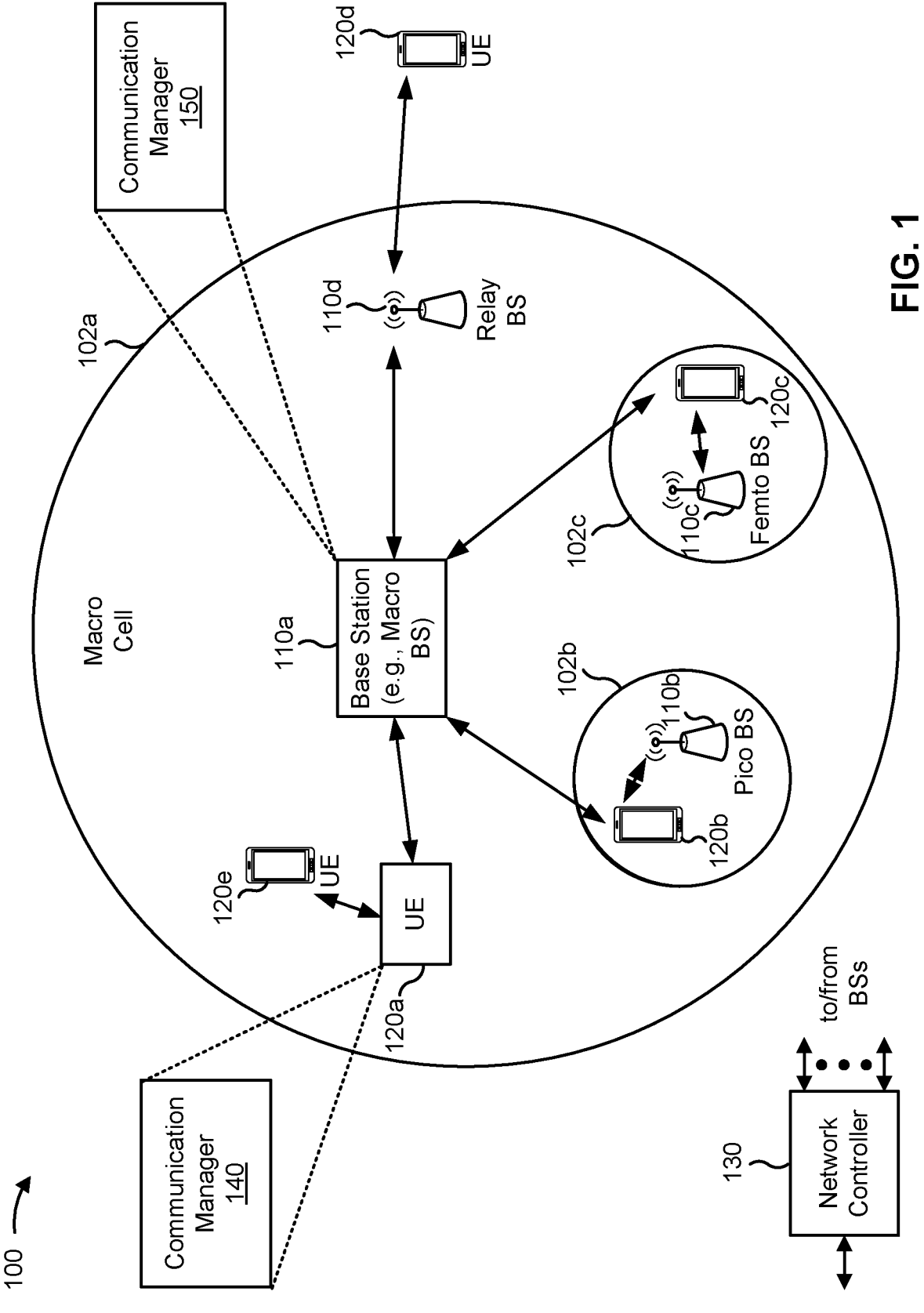
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TR", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure; and transmit at least one PUSCH repetition associated with the RRC connection request message based at least in part on the request. Additionally, or alternatively, the communication manager 140 may perform one or more other operations described herein.

In some aspects, the base station 110 may include a communication manager 150. As described in more detail elsewhere herein, the communication manager 150 may receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and receive at least one PUSCH repetition associated with the RRC connection request message based at least in part on the request. Additionally, or alternatively, the communication manager 150 may perform one or more other operations described herein.

As indicated above, FIG. 1 is provided as an example. Other examples may differ from what is described with regard to FIG. 1.

Figure 2:
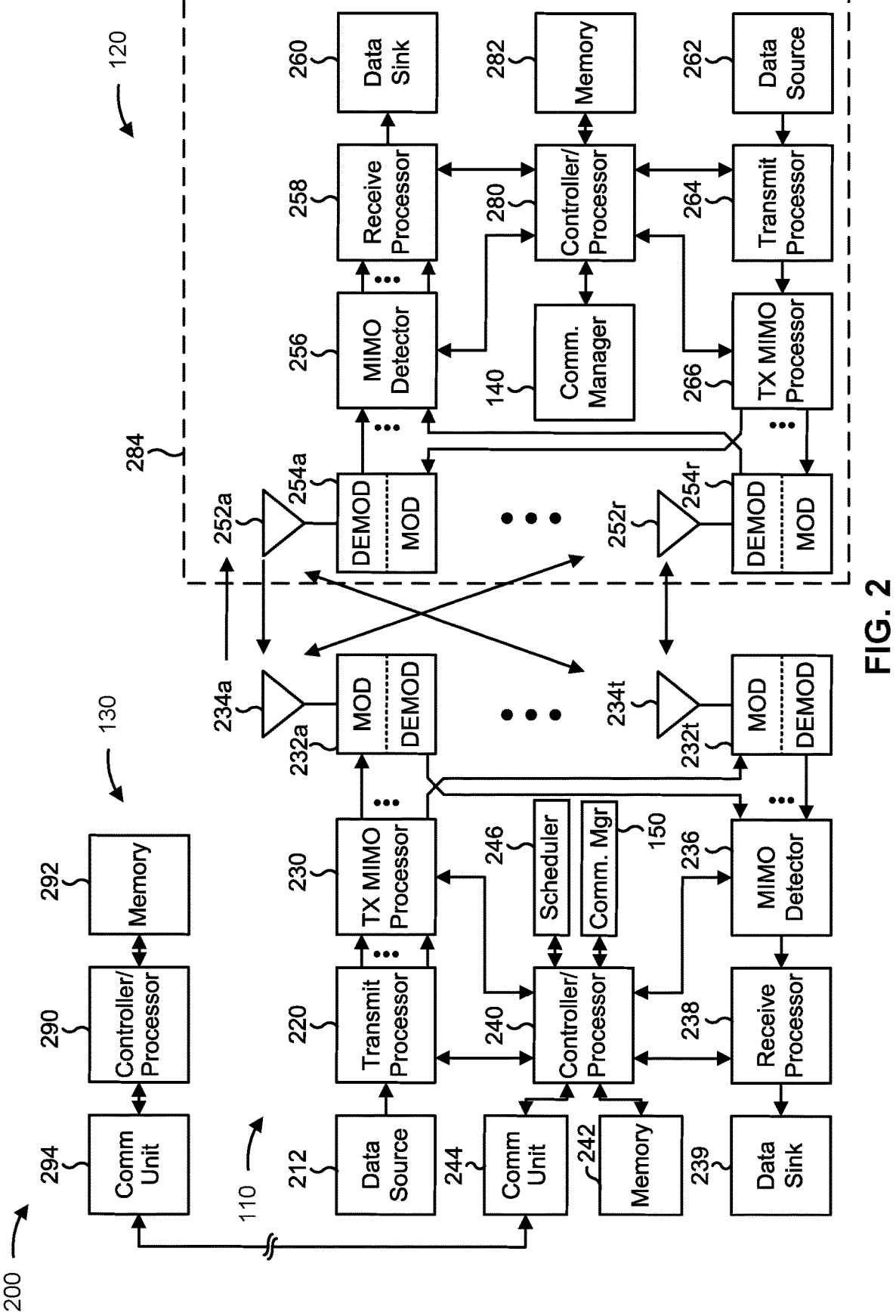
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with PRACH occasions for transmitting PUSCH repetition requests, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for transmitting a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and/or means for transmitting at least one PUSCH repetition associated with the RRC connection request message based at least in part on the request. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for receiving a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure; and/or means for receiving at least one PUSCH repetition associated with the RRC connection request message based at least in part on the request. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
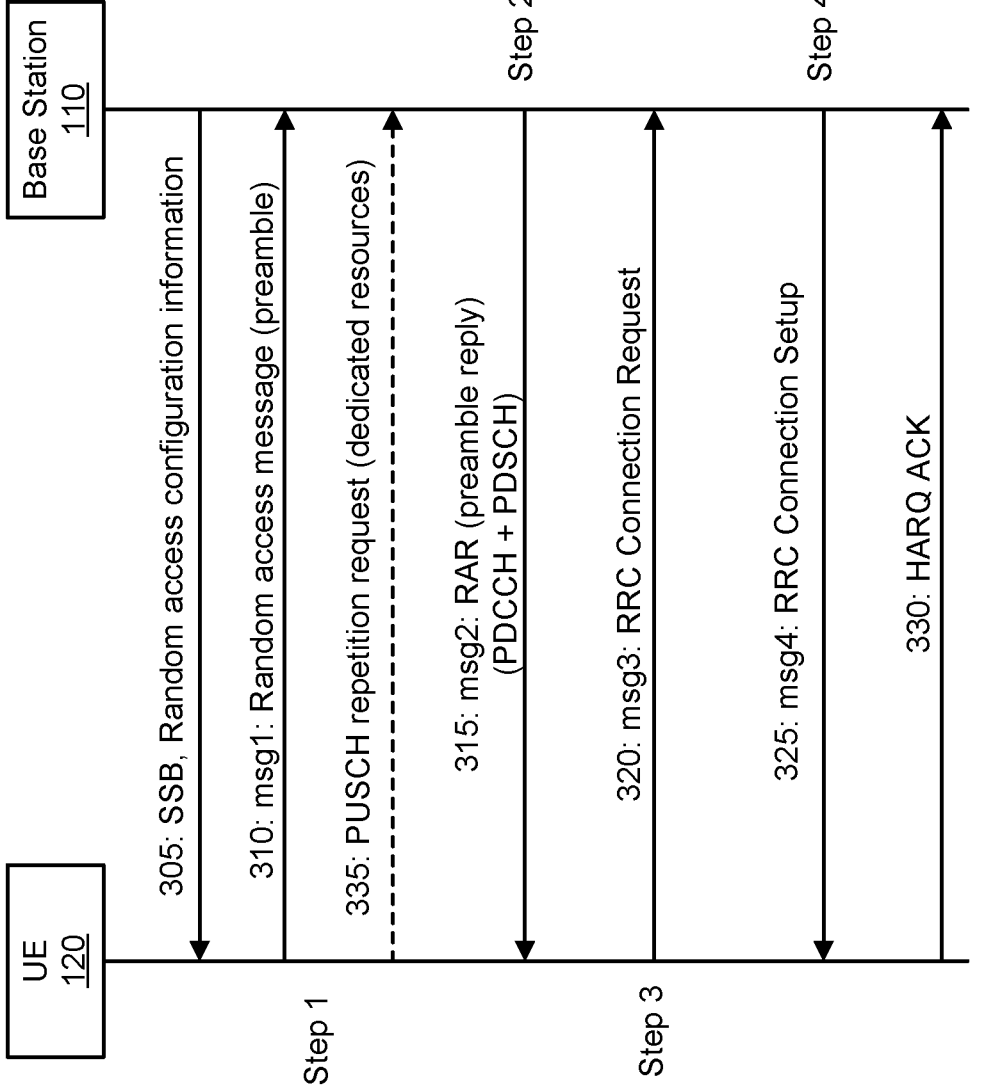
FIG. 3 a diagram illustrating an example of a four-step random access channel (RACH) operation, in accordance with the present disclosure.

FIG. 3 is a diagram illustrating an example of a four-step RACH operation, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM), one or more parameters for receiving a random access response (RAR), and/or the like.

As shown by reference number 310, the UE 120 may transmit a RAM with a RACH request via a PRACH. The RAM may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3) (see below).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC protocol data unit (PDU) of the PDSCH communication.

As shown by reference number 320, the UE 120 may transmit an RRC connection request message. The RRC connection request message may be referred to as message 3, msg3, MSG3, a UE identification message, or a third message of a four-step random access procedure. In some aspects, the RRC connection request may include a UE identifier, uplink control information (UCI), a PUSCH communication (e.g., an RRC connection request), and/or the like.

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 330, if the UE 120 successfully receives the RRC connection setup message, the UE 120 may transmit a HARQ ACK.

RACH procedures may have coverage limitations, which may cause negative impacts on network performance. In some cases, RACH messages may be missed by UEs or inaccurately decoded by UEs. As a result, RRC connection setup messages may not be transmitted effectively, compromising network connection. Repetition of PUSCH associated with RRC connection setup messages may facilitate more effective coverage. However, scheduling PUSCH repetition for UEs for which coverage is not an issue may result in inefficiencies that cause resources to be wasted.

Aspects of techniques described herein may facilitate efficient PUSCH repetition associated with RRC connection setup request messages during RACH procedures. For example, as shown by reference number 335, some aspects may enable a UE to request PUSCH repetition via dedicated PRACH resources. Thus, aspects may enable PUSCH repetition only when, and to the extent that, it may benefit a UE, which may result in efficient coverage enhancement for RRC connection, which may positively impact network performance, thereby saving resources (e.g., computing, memory, communication, and network resources) that would be wasted in connection with scheduling PUSCH repetition for UEs for which coverage is not an issue.

As indicated above, FIG. 3 is provided as an example. Other examples may differ from what is described with regard to FIG. 3.

Figure 4:
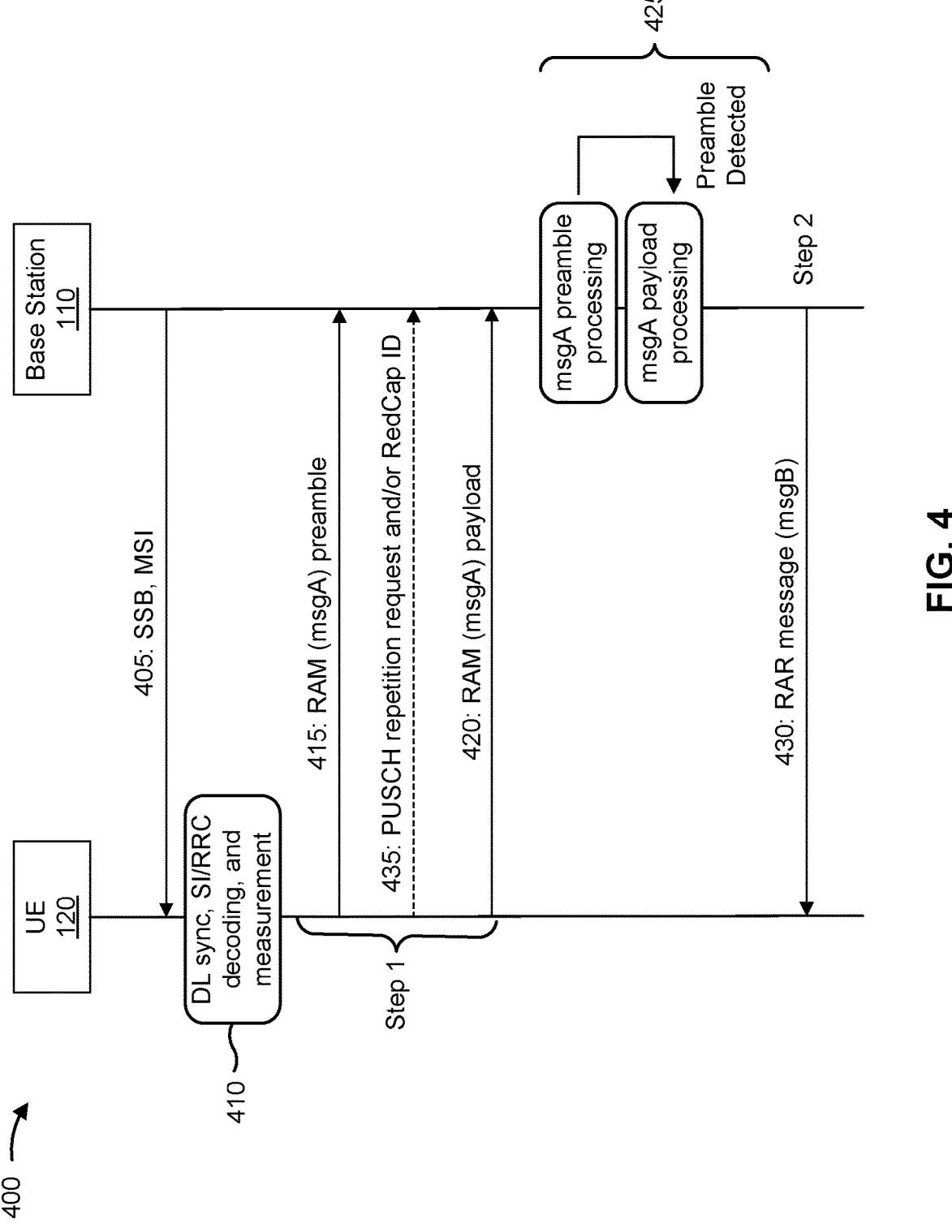
FIG. 4 is a diagram illustrating an example of a two-step RACH procedure, in accordance with the present disclosure.

In some cases, however, one or more RACH occasions may be shared by a four-step RACH procedure and a two-step RACH procedure. FIG. 4 is a diagram illustrating an example 400 of a call flow for configuring an uplink bandwidth part for a two-step RACH procedure, in accordance with the present disclosure.

As shown in FIG. 4, a base station 110 and a UE 120 may communicate with one another to perform the two-step RACH procedure.

As shown by reference number 405, the base station 110 may transmit, and the UE 120 may receive, one or more SSBs and/or minimum system information (MSI) that includes RACH configuration information. The MSI may include, for example, one or more SIBs. The SSBs, MSI, and/or the like may include information related to one or more RACH occasion (RO) configurations, such as information related to one or more ordered preamble resources. As shown by reference number 410, the UE 120 may perform downlink (DL) synchronization (e.g., using one or more SSBs), decode system information (SI) and/or RRC configuration information included in one or more SIBs, perform one or more measurements of reference signals (RSs), and/or the like. Based at least in part on performing the second operation 410, the UE 120 may determine one or more parameters for transmitting a random access message (RAM) in the two-step RACH procedure. For example, the UE 120 may determine one or more PRACH transmission parameters to be used to transmit the RAM, may determine one or more parameters for generating a preamble of the RAM, may identify one or more uplink resources on which the RAM is to be transmitted, and/or the like.

As shown by reference number 415, the UE 120 may transmit a RAM preamble. As shown by reference number 420, the UE 120 may transmit a RAM payload. As shown, the UE 120 may transmit the RAM preamble and the RAM payload as part of a first step of the two-step RACH procedure. The RAM is sometimes referred to as message A, msgA, an uplink message, a request message, a first (or initial) message in a two-step RACH procedure, and/or the like. The RAM preamble is sometimes referred to as a message A preamble, a msgA preamble, a preamble, and/or the like. The RAM payload is sometimes referred to as a message A payload, a msgA payload, a payload, and/or the like.

In some aspects, the RAM may include some or all of the contents of message 1 (msg1) and message 3 (msg3) of a four-step RACH procedure. For example, the RAM preamble may include some or all contents of message 1 (e.g., a RACH preamble), and the RAM payload may include some or all contents of message 3. For example, in some aspects, the RAM payload may include an identifier associated with the UE 120, uplink control information, a medium access control (MAC) layer control element (e.g., a power headroom report, a buffer status report, a beam failure report, a channel state report, and/or the like), user plane data, control plane data, and/or the like. Furthermore, in some aspects, the msgA preamble and the msgA payload may be time division multiplexed (TDMed) with one another, whereby the msgA preamble and the msgA payload may be transmitted in separate symbols based at least in part on a time division multiplexing configuration.

As shown by reference number 425, the base station 110 may receive the RAM preamble transmitted by the UE 120. If the base station 110 successfully receives and decodes the RAM preamble, the base station 110 may then receive and decode the RAM payload. As shown by reference number 430, the base station 110 may transmit a random access response (RAR) message. As shown, the base station 110 may transmit the RAR message as part of a second step of the two-step RACH procedure. The RAR message is sometimes referred to as message B, msgB, a response message, a second message in a two-step RACH procedure, and/or the like.

The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, and/or the like. In some aspects, the RAR message may include a first portion transmitted via a physical downlink control channel (PDCCH) (e.g., to include some or all of the contents of msg2 of the four-step RACH procedure) and a second portion transmitted via a physical downlink shared channel (PDSCH) (e.g., to include some or all of the contents of msg4 of the four-step RACH procedure). In some aspects, based on whether the UE 120 successfully receives and decodes the RAR message, the UE 120 may transmit hybrid automatic repeat request (HARQ) feedback to the base station 110 via a physical uplink control channel (PUCCH) (e.g., an acknowledgement (ACK) to indicate that the RAR message was successfully received and decoded or a negative acknowledgement (NACK) to indicate that the RAR message was not successfully received and decoded).

As indicated above, a four-step RACH procedure and a two-stage RACH procedure may share PRACH resources. Additionally, a wireless communication standard may be configured to support a reduced capability device (RedCap). In some aspects, a network may serve different UEs of different categories and/or different UEs that support different capabilities. For example, a base station may serve a first category of UEs that have a less advanced capability (e.g., a lower capability and/or a reduced capability) and a second category of UEs that have a more advanced capability (e.g., a higher capability).

A UE of the first category may have a reduced feature set compared to UEs of the second category, and may be referred to as a reduced capability (RedCap) UE, a low tier UE, and/or an NR-Lite UE, among other examples. A UE of the second category may be an ultra-reliable low-latency communication (URLLC) device and/or an enhanced mobile broadband (eMBB) device and may have an advanced feature set compared to RedCap UEs. RedCap UEs may include wearable devices, Internet of Things (IoT) devices, sensors, cameras, and/or the like that are associated with a limited bandwidth, power capacity, and/or transmission range, among other examples. A UE of the second category may be referred to as a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum modulation and coding scheme (MCS) than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part as a UE of the second category, among other examples.

Various aspects of the techniques and apparatuses described herein may include configuring a UE to transmit a request for PUSCH repetition during PRACH occasions that may be shared and/or to indicate a RedCap identification during PRACH resources. For example, as shown by reference number 435 in FIG. 4, the UE 120 may transmit a PUSCH repetition request and/or RedCap identification via PRACH resources associated with a RAM in a two-step RACH procedure. Thus, aspects may enable PUSCH repetition requests and/or RedCap identifications via PRACH resources that may be shared by RACH procedures, which may result in efficient coverage enhancement for RRC connection, which may positively impact network performance, thereby saving resources (e.g., computing, memory, communication, and network resources).

As indicated above, FIG. 4 is provided as an example. Other examples may differ from what is described with respect to FIG. 4.

Figure 5:
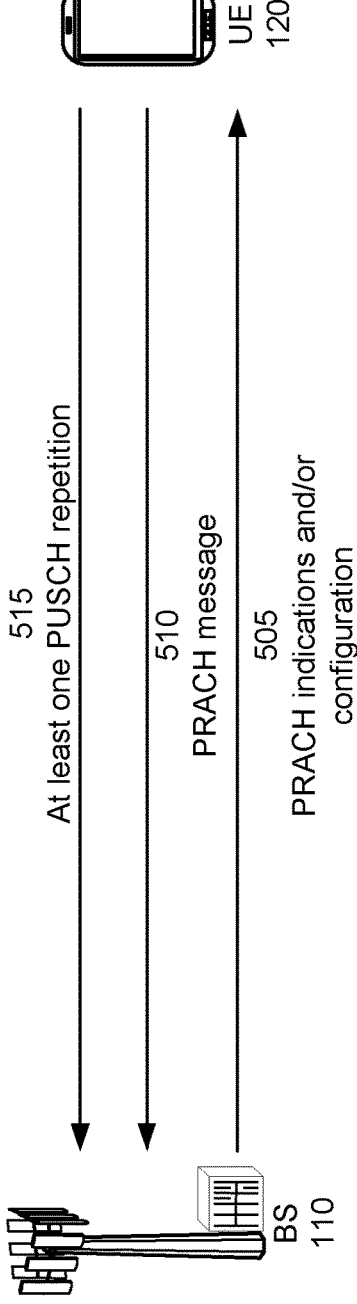
FIG. 5 is a diagram illustrating an example associated with physical random access channel (PRACH) occasions for transmitting physical uplink shared channel (PUSCH) repetition requests, in accordance with the present disclosure.

FIG. 5 is a diagram illustrating an example 500 of an enhanced on-demand system information procedure, in accordance with the present disclosure. As shown in FIG. 5, a BS 110 and a UE 120 may communicate with one another.

As shown by reference number 505, the base station 110 may transmit, and the UE 120 may receive, one or more PRACH indications and/or configurations. The one or more PRACH indications and/or configurations may be transmitted via system information (e.g., a system information block (SIB)).

In some aspects, the one or more indications and/or configurations may include an indication that a dedicated PRACH occasion is to be used for transmitting requests for PUSCH repetition corresponding to requests for RRC connection request messages. In some aspects, the base station 110 may transmit an indication of a PUSCH request configuration. The PUSCH request configuration may indicate one or more subsets of a plurality of PRACH occasions from which a PRACH message is to be selected. The one or more subsets may include at least one of a first subset of the plurality of PRACH occasions, where all of the PRACH occasions in the first subset are associated with only the four-step RACH procedure; a second subset of the plurality of PRACH occasions, where all of the PRACH occasions in the second subset are associated with only the two-step RACH procedure; or a third subset of the plurality of PRACH occasions, where the third subset comprises the at least one shared PRACH occasion.

As shown by reference number 510, the UE 120 may transmit, and the base station 110 may receive, a PRACH message corresponding to a PRACH occasion. In some aspects, the PRACH occasion may include a dedicated PRACH occasion or one of a plurality of PRACH occasions comprising at least one shared PRACH occasion associated with a two-step RACH procedure and a four-step RACH procedure. The PRACH message may include a request for PUSCH repetition corresponding to an RRC connection request message of the four-step RACH procedure.

In some aspects, the PRACH occasion may be associated with the four-step RACH procedure. The UE 120 may transmit an additional PRACH message corresponding to an additional PRACH occasion, where the PRACH occasion and the additional PRACH occasion are selected from a subset of the plurality of PRACH occasions, and where all of the PRACH occasions in the subset are associated with only the four-step RACH procedure. In some aspects, the PRACH occasion and the additional PRACH occasion may be selected from a subset of the plurality of PRACH occasions, and the subset may include the at least one shared PRACH occasion.

In some aspects, the PRACH may be associated with the two-step RACH procedure. The UE 120 may transmit an additional PRACH message corresponding to an additional PRACH occasion, where the PRACH occasion and the additional PRACH occasion are selected from a subset of the plurality of PRACH occasions. In some aspects, all of the PRACH occasions in the subset may be associated with only the two-step RACH procedure. In some aspects, the subset may include the at least one shared PRACH occasion.

In some aspects, the UE may transmit an additional PRACH message corresponding to an additional PRACH occasion of the plurality of PRACH occasions. The additional PRACH message may include a RedCap UE identification (ID) that indicates that the UE is a RedCap UE. In some aspects, the PRACH message may include a first PRACH preamble associated with a first set of PRACH preambles, and the additional PRACH message may include a second PRACH preamble associated with a second set of PRACH preambles, wherein the second set of PRACH preambles does not overlap the first set of PRACH preambles.

As shown by reference number 515, the UE 120 may transmit at least one PUSCH repetition associated with the RRC connection request message based at least in part on the request.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the ULE (e.g., UE 120) performs operations associated with PRACH occasions for transmitting PUSCH repetition requests.

As shown in FIG. 6, in some aspects, process 600 may include transmitting a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure (block 610). For example, the UE (e.g., using communication manager 140 and/or transmission component 804, depicted in FIG. 8) may transmit a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC) connection request message of the four-step RACH procedure, as described above.

As further shown in FIG. 6, in some aspects, process 600 may include transmitting at least one PUSCH repetition associated with the RRC connection request message based at least in part on the request (block 620). For example, the UE (e.g., using communication manager 140 and/or transmission component 804, depicted in FIG. 8) may transmit at least one PUSCH repetition associated with the RRC connection request message based at least in part on the request, as described above.

Process 600 may include additional aspects, such as any single aspect or any combination of aspects described below and/or in connection with one or more other processes described elsewhere herein.

In a first aspect, the PRACH occasion comprises the dedicated PRACH occasion, and process 600 includes receiving an indication that the dedicated PRACH occasion is to be used for transmitting requests for PUSCH repetition corresponding to requests for RRC connection request messages.

In a second aspect, alone or in combination with the first aspect, receiving the indication comprises receiving system information that includes the indication.

In a third aspect, alone or in combination with the first aspect, the PRACH occasion is associated with the four-step RACH procedure.

In a fourth aspect, alone or in combination with the third aspect, process 600 includes transmitting an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

In a fifth aspect, alone or in combination with the third aspect, process 600 includes transmitting an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

In a sixth aspect, alone or in combination with one or more of the first through fifth aspects, the PRACH occasion is associated with the two-step RACH procedure.

In a seventh aspect, alone or in combination with the sixth aspect, process 600 includes transmitting an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

In an eighth aspect, alone or in combination with the sixth aspect, process 600 includes transmitting an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

In a ninth aspect, alone or in combination with one or more of the first through eighth aspects, process 600 includes receiving an indication of a PUSCH request configuration that indicates one or more subsets of the plurality of PRACH occasions from which the PRACH message is to be selected.

In a tenth aspect, alone or in combination with the ninth aspect, the one or more subsets include at least one of a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

In an eleventh aspect, alone or in combination with one or more of the ninth through tenth aspects, receiving the indication of the PUSCH request configuration comprises receiving system information that includes the indication.

In a twelfth aspect, alone or in combination with the eleventh aspects, the system information comprises a system information block.

In a thirteenth aspect, alone or in combination with one or more of the first through twelfth aspects, process 600 includes transmitting an additional PRACH message corresponding to an additional PRACH occasion of the plurality of PRACH occasions, wherein the additional PRACH message includes a RedCap UE identification that indicates that the UE is a RedCap UE.

In a fourteenth aspect, alone or in combination with the thirteenth aspect, the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with the present disclosure. Example process 700 is an example where the base station (e.g., base station 110) performs operations associated with PRACH occasions for transmitting PUSCH repetition requests.

As shown in FIG. 7, in some aspects, process 700 may include receiving a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure (block 710). For example, the base station (e.g., using communication manager 150 and/or reception component 902, depicted in FIG. 9) may receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure, as described above.

As further shown in FIG. 7, in some aspects, process 700 may include receiving at least one PUSCH repetition associated with the RRC connection request message based at least in part on the request (block 720). For example, the base station (e.g., using communication manager 150 and/or reception component 902, depicted in FIG. 9) may receive at least one PUSCH repetition associated with the RRC connection request message based at least in part on the request, as described above.

Process 700 may include additional aspects, such as any single aspect or any combination of aspects described below and/or in connection with one or more other processes described elsewhere herein.

In a first aspect, the PRACH occasion is associated with the four-step RACH procedure.

In a second aspect, alone or in combination with the first aspect, process 700 includes receiving an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

In a third aspect, alone or in combination with the first aspect, process 700 includes receiving an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

In a fourth aspect, alone or in combination with one or more of the first through third aspects, the PRACH occasion is associated with the two-step RACH procedure.

In a fifth aspect, alone or in combination with the fourth aspect, process 700 includes receiving an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

In a sixth aspect, alone or in combination with the fourth aspect, process 700 includes receiving an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

In a seventh aspect, alone or in combination with one or more of the first through sixth aspects, process 700 includes transmitting at least one of an indication that the PRACH occasion is to be used for transmitting requests for PUSCH repetition corresponding to requests for RRC connection request messages, wherein the PRACH occasion comprises the dedicated PRACH occasion, or an indication of a PUSCH request configuration that indicates one or more subsets of the plurality of PRACH occasions from which the PRACH message is to be selected.

In an eighth aspect, alone or in combination with the seventh aspect, the one or more subsets include at least one of a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

In a ninth aspect, alone or in combination with one or more of the seventh through eighth aspects, transmitting the indication of the PUSCH request configuration comprises transmitting system information that includes the indication.

In a tenth aspect, alone or in combination with the ninth aspect, the system information comprises a system information block.

In an eleventh aspect, alone or in combination with one or more of the first through tenth aspects, process 700 includes receiving an additional PRACH message corresponding to an additional PRACH occasion of the plurality of PRACH occasions, wherein the additional PRACH message includes a reduced capability (RedCap) UE identification that indicates that the UE is a RedCap UE.

In a twelfth aspect, alone or in combination with the eleventh aspect, the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
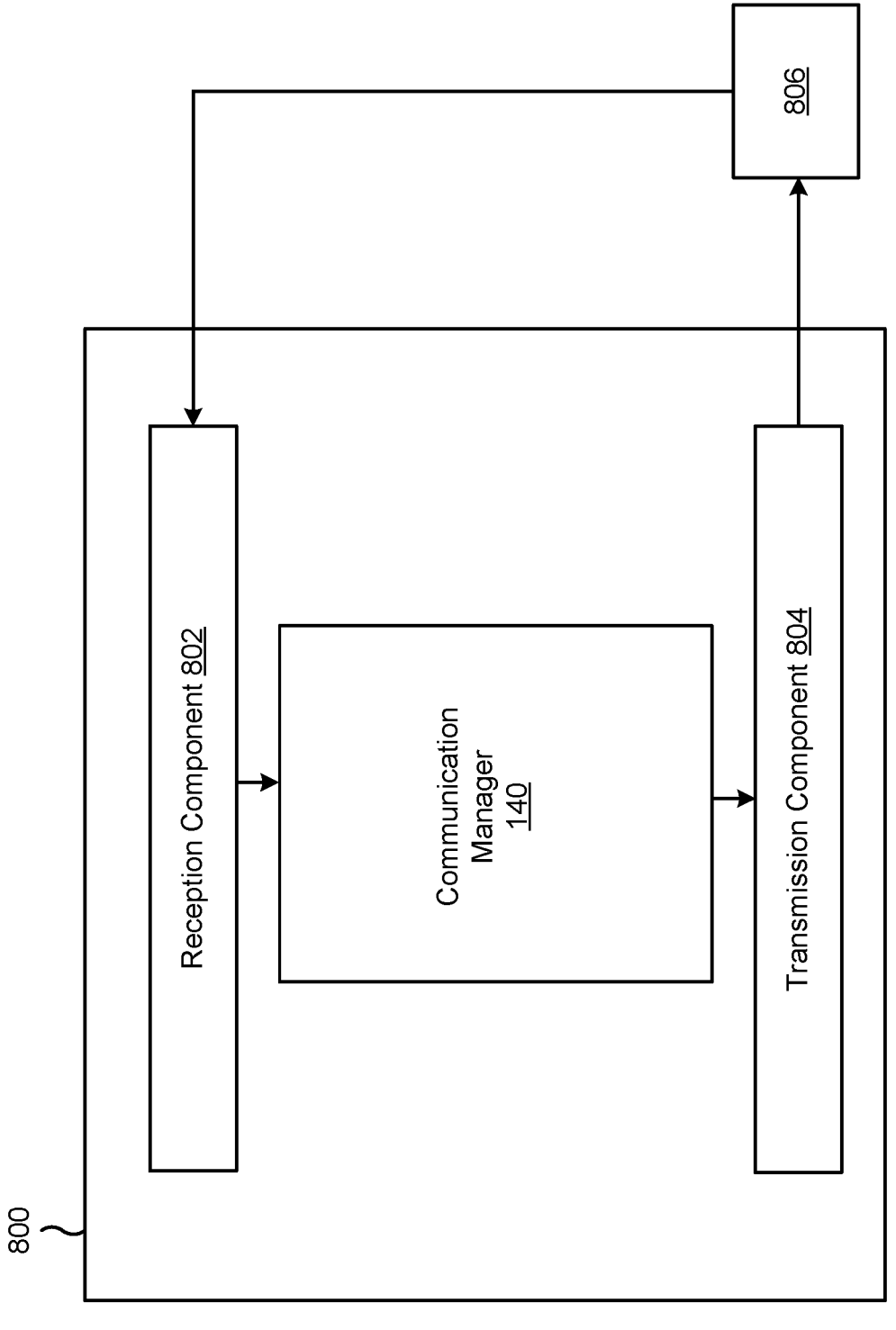
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure. The transmission component 804 may transmit at least one PUSCH repetition associated with the RRC connection request message based at least in part on the request.

The transmission component 804 may transmit an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

The transmission component 804 may transmit an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

The transmission component 804 may transmit an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

The transmission component 804 may transmit an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

The reception component 802 may receive an indication of a PUSCH request configuration that indicates one or more subsets of the plurality of PRACH occasions from which the PRACH message is to be selected.

The transmission component 804 may transmit an additional PRACH message corresponding to an additional PRACH occasion of the plurality of PRACH occasions, wherein the additional PRACH message includes a RedCap UE identification that indicates that the UE is a RedCap UE.

The communication manager 140 may perform any number of tasks associated with managing communications such as, for example, directing the reception component 802 and/or the transmission component 804. In some aspects, the communication manager 140 may include one or more antennas, a modulator, a transmit MIMO processor, a transmit processor, a controller/processor, a memory, or a combination thereof, of the UE described in connection with FIG. 2. In some aspects, the communication manager 140 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
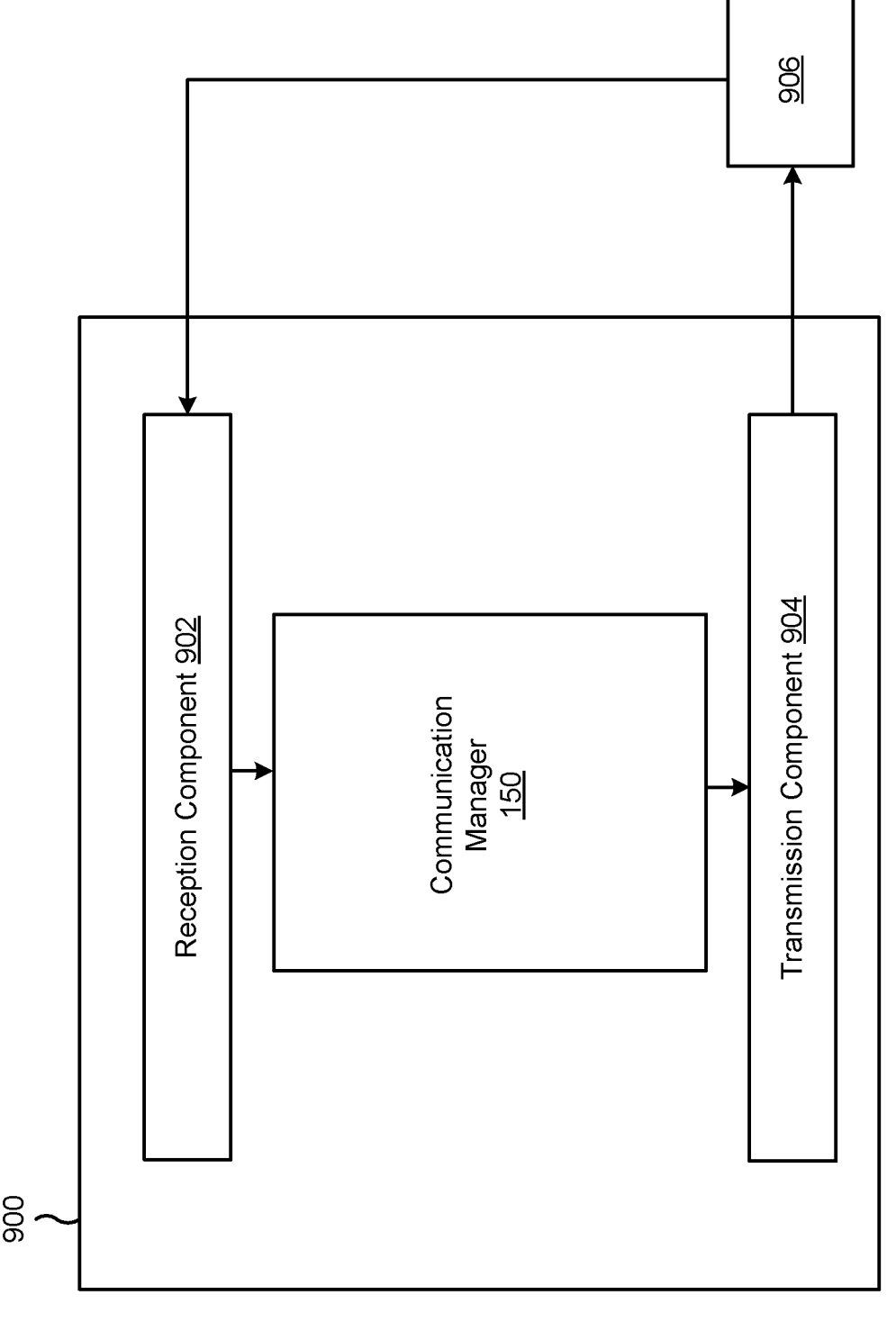

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive a PRACH message corresponding to a PRACH occasion, wherein the PRACH occasion comprises a dedicated PRACH occasion or one of a plurality of PRACH occasions comprising at least one shared PRACH occasion associated with a two-step RACH procedure and a four-step RACH procedure, wherein the PRACH message includes a request for PUSCH repetition corresponding to an RRC connection request message of the four-step RACH procedure. The reception component 902 may receive at least one PUSCH repetition associated with the RRC connection request message based at least in part on the request.

The reception component 902 may receive an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

The reception component 902 may receive an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

The reception component 902 may receive an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

The reception component 902 may receive an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

The transmission component 904 may transmit at least one of an indication that the PRACH occasion is to be used for transmitting requests for PUSCH repetition corresponding to requests for RRC connection request messages, wherein the PRACH occasion comprises the dedicated PRACH occasion, or an indication of a PUSCH request configuration that indicates one or more subsets of the plurality of PRACH occasions from which the PRACH message is to be selected.

The reception component 902 may receive an additional PRACH message corresponding to an additional PRACH occasion of the plurality of PRACH occasions, wherein the additional PRACH message includes a RedCap UE identification that indicates that the UE is a RedCap UE.

The communication manager 150 may perform any number of tasks associated with managing communications such as, for example, directing the reception component 902 and/or the transmission component 904. In some aspects, the communication manager 150 may include one or more antennas, a modulator, a transmit MIMO processor, a transmit processor, a controller/processor, a memory, or a combination thereof, of the base station described in connection with FIG. 2. In some aspects, the communication manager 150 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure; and transmitting at least one PUSCH repetition associated with the RRC connection request message based at least in part on the request.

Aspect 2: The method of Aspect 1, wherein the PRACH occasion comprises the dedicated PRACH occasion, the method further comprising receiving an indication that the dedicated PRACH occasion is to be used for transmitting requests for PUSCH repetition corresponding to requests for RRC connection request messages.

Aspect 3: The method of Aspect 2, wherein receiving the indication comprises receiving system information that includes the indication.

Aspect 4: The method of Aspect 1, wherein the PRACH occasion is associated with the four-step RACH procedure.

Aspect 5: The method of Aspect 4, further comprising transmitting an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

Aspect 6: The method of Aspect 4, further comprising transmitting an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

Aspect 7: The method of Aspect 1, wherein the PRACH occasion is associated with the two-step RACH procedure.

Aspect 8: The method of Aspect 7, further comprising transmitting an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

Aspect 9: The method of Aspect 7, further comprising transmitting an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

Aspect 10: The method of any of Aspects 1-9, further comprising receiving an indication of a PUSCH request configuration that indicates one or more subsets of the plurality of PRACH occasions from which the PRACH message is to be selected.

Aspect 11: The method of Aspect 10, wherein the one or more subsets include at least one of: a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

Aspect 12: The method of either of Aspects 10 or 11, wherein receiving the indication of the PUSCH request configuration comprises receiving system information that includes the indication.

Aspect 13: The method of Aspect 12, wherein the system information comprises a system information block.

Aspect 14: The method of any of Aspects 1-13, further comprising transmitting an additional PRACH message corresponding to an additional PRACH occasion of the plurality of PRACH occasions, wherein the additional PRACH message includes a reduced capability (Red-Cap) UE identification that indicates that the UE is a RedCap UE.

Aspect 15: The method of Aspect 14, wherein the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

Aspect 16: A method of wireless communication performed by a base station, comprising: receiving a physical random access channel (PRACH) message corresponding to a PRACH occasion, wherein the PRACH occasion comprises a dedicated PRACH occasion or one of a plurality of PRACH occasions comprising at least one shared PRACH occasion associated with a two-step random access channel (RACH) procedure and a four-step RACH procedure, wherein the PRACH message includes a request for physical uplink shared channel (PUSCH) repetition corresponding to a radio resource control (RRC) connection request message of the four-step RACH procedure; and receiving at least one PUSCH repetition associated with the RRC connection request message based at least in part on the request.

Aspect 17: The method of Aspect 16, wherein the PRACH occasion is associated with the four-step RACH procedure.

Aspect 18: The method of Aspect 17, further comprising receiving an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the four-step RACH procedure.

Aspect 19: The method of Aspect 17, further comprising receiving an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

Aspect 20: The method of Aspect 16, wherein the PRACH occasion is associated with the two-step RACH procedure.

Aspect 21: The method of Aspect 20, further comprising receiving an additional PRACH message corresponding to an additional PRACH occasion, wherein the PRACH occasion and the additional PRACH occasion are selected from a subset of the plurality of PRACH occasions, and wherein all of the PRACH occasions in the subset are associated with only the two-step RACH procedure.

Aspect 22: The method of Aspect 20, further comprising receiving an additional PRACH message corresponding to an additional PRACH occasion, wherein the PRACH occasion and the additional PRACH occasion are selected from a subset of the plurality of PRACH occasions, and wherein the subset comprises the at least one shared PRACH occasion.

Aspect 23: The method of any of Aspects 16-22, further comprising transmitting at least one of: an indication that the PRACH occasion is to be used for transmitting requests for PUSCH repetition corresponding to requests for RRC connection request messages, wherein the PRACH occasion comprises the dedicated PRACH occasion, or an indication of a PUSCH request configuration that indicates one or more subsets of the plurality of PRACH occasions from which the PRACH message is to be selected.

Aspect 24: The method of Aspect 23, wherein the one or more subsets include at least one of: a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

Aspect 25: The method of either of Aspects 23 or 24, wherein transmitting the indication of the PUSCH request configuration comprises transmitting system information that includes the indication.

Aspect 26: The method of Aspect 25, wherein the system information comprises a system information block.

Aspect 27: The method of any of Aspects 16-26, further comprising receiving an additional PRACH message corresponding to an additional PRACH occasion of the plurality of PRACH occasions, wherein the additional PRACH message includes a reduced capability (RedCap) UE identification that indicates that the UE is a RedCap UE.

Aspect 28: The method of Aspect 27, wherein the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and
one or more processors, coupled to the one or more memories, configured to:
receive an indication of a physical uplink shared channel (PUSCH) request configuration that indicates one or more subsets of a plurality of physical random access channel (PRACH) occasions from which a PRACH message is to be transmitted, the indication being received in system information that comprises a system information block;
transmit the PRACH message corresponding to the one or more subsets of the PRACH occasions, wherein the one or more subsets of the PRACH occasions comprises a dedicated PRACH occasion comprising at least one shared PRACH occasion associated with a two-step random access channel (RACH) procedure and a four-step RACH procedure, wherein the PRACH message includes a request for PUSCH repetition corresponding to a radio resource control (RRC) connection request message of the four-step RACH procedure; and
transmit at least one PUSCH repetition associated with the RRC connection request message based at least in part on the request.

2. The UE of claim 1, wherein the one or more processors are further configured to receive a second indication that the dedicated PRACH occasion is to be used for transmitting requests for PUSCH repetition corresponding to requests for RRC connection request messages.

3. The UE of claim 2, wherein the one or more processors, to receive the second indication, are configured to receive system information that includes the indication.

4. The UE of claim 1, wherein the one or more subsets include at least one of:
a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or
a third subset of the plurality of PRACH occasions, wherein the third subset comprises the at least one shared PRACH occasion.

5. The UE of claim 1, wherein the PRACH message comprises a PRACH preamble associated with a set of preambles configured only in the plurality of PRACH occasions, and wherein the plurality of PRACH occasions are associated with the four-step RACH procedure, and wherein the plurality of PRACH occasions are configured with one or more PRACH preambles that are not used for requesting repetition of the RRC connection request message.

6. The UE of claim 5, wherein the one or more processors are further configured to transmit an additional PRACH message corresponding to an additional PRACH occasion, wherein the additional PRACH occasion is selected from a subset of the plurality of PRACH occasions, and wherein all of the PRACH occasions in the subset are associated with only the four-step RACH procedure.

7. The UE of claim 5, wherein the one or more processors are further configured to transmit an additional PRACH message corresponding to an additional PRACH occasion, wherein the additional PRACH occasion is selected from a subset of the plurality of PRACH occasions, and wherein the subset comprises the at least one shared PRACH occasion.

8. The UE of claim 1, wherein the plurality of PRACH occasions are associated with the two-step RACH procedure.

9. The UE of claim 8, wherein the one or more processors are further configured to transmit an additional PRACH message corresponding to an additional PRACH occasion, wherein the additional PRACH occasion is selected from a subset of the plurality of PRACH occasions, and wherein all of the PRACH occasions in the subset are associated with only the two-step RACH procedure.

10. The UE of claim 8, wherein the one or more processors are further configured to transmit an additional PRACH message corresponding to an additional PRACH occasion, wherein the additional PRACH occasion is selected from a subset of the plurality of PRACH occasions, and wherein the subset comprises the at least one shared PRACH occasion.

11. The UE of claim 1, wherein the one or more processors are further configured to transmit an additional PRACH message corresponding to an additional PRACH occasion of the plurality of PRACH occasions, wherein the additional PRACH message includes a reduced capability (RedCap) UE identification that indicates that the UE is a RedCap UE.

12. The UE of claim 11, wherein the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

13. A network entity for wireless communication, comprising:
one or more memories; and
one or more processors, coupled to the one or more memories, configured to:
transmit an indication of a physical uplink shared channel (PUSCH) request configuration that indicates one or more subsets of a plurality of physical random access channel (PRACH) occasions from which a PRACH message is to be transmitted, the indication being received in system information that comprises a system information block;

receive the PRACH message corresponding to the one or more subsets of the PRACH occasions, wherein the one or more subsets of the PRACH occasions comprises a dedicated PRACH occasion comprising at least one shared PRACH occasion associated with a two-step random access channel (RACH) procedure and a four-step RACH procedure, wherein the PRACH message includes a request for PUSCH repetition corresponding to a radio resource control (RRC) connection request message of the four-step RACH procedure; and receive at least one PUSCH repetition associated with the RRC connection request message based at least in part on the request.

14. The network entity of claim 13, wherein the PRACH message comprises a PRACH preamble associated with a set of preambles configured only in the plurality of PRACH occasions, and wherein the plurality of PRACH occasions are associated with the four-step RACH procedure, and wherein the plurality of PRACH occasions are configured with one or more PRACH preambles that are not used for requesting repetition of the RRC connection request message.

15. The network entity of claim 14, wherein the one or more processors are further configured to receive an additional PRACH message corresponding to an additional PRACH occasion, wherein additional PRACH occasion is selected from a subset of the plurality of PRACH occasions, and wherein all of the PRACH occasions in the subset are associated with only the four-step RACH procedure.

16. The network entity of claim 14, wherein the one or more processors are further configured to receive an additional PRACH message corresponding to an additional PRACH occasion, wherein the additional PRACH occasion is selected from a subset of the plurality of PRACH occasions, and wherein the subset comprises the at least one shared PRACH occasion.

17. The network entity of claim 13, wherein the plurality of PRACH occasions are associated with the two-step RACH procedure.

18. The network entity of claim 17, wherein the one or more processors are further configured to receive an additional PRACH message corresponding to an additional PRACH occasion, wherein the additional PRACH occasion is selected from a subset of the plurality of PRACH occasions, and wherein all of the PRACH occasions in the subset are associated with only the two-step RACH procedure.

19. The network entity of claim 17, wherein the one or more processors are further configured to receive an additional PRACH message corresponding to an additional PRACH occasion, wherein the additional PRACH occasion is selected from a subset of the plurality of PRACH occasions, and wherein the subset comprises the at least one shared PRACH occasion.

20. The network entity of claim 13, wherein the one or more processors are further configured to transmit:

an indication that the PRACH occasion is to be used for transmitting requests for PUSCH repetition corresponding to requests for RRC connection request messages, wherein the PRACH occasion comprises the dedicated PRACH occasion.

21. The network entity of claim 20, wherein the one or more subsets include at least one of:

a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

22. The network entity of claim 13, wherein the one or more processors are further configured to receive an additional PRACH message corresponding to an additional PRACH occasion of the plurality of PRACH occasions, wherein the additional PRACH message includes a reduced capability (RedCap) user equipment (UE) identification that indicates that a UE is a RedCap UE.

23. The network entity of claim 22, wherein the PRACH message comprises a first PRACH preamble associated with a first set of PRACH preambles, wherein the additional PRACH message comprises a second PRACH preamble associated with a second set of PRACH preambles, and wherein the second set of PRACH preambles does not overlap the first set of PRACH preambles.

24. A method of wireless communication performed by a user equipment (UE), comprising:

receiving an indication of a physical uplink shared channel (PUSCH) request configuration that indicates one or more subsets of a plurality of physical random access channel (PRACH) occasions from which a PRACH message is to be transmitted, the indication being received in system information that comprises a system information block;

transmitting the PRACH message corresponding to the one or more subsets of the PRACH occasions, wherein the one or more subsets of the PRACH occasions comprises a dedicated PRACH occasion comprising at least one shared PRACH occasion associated with a two-step random access channel (RACH) procedure and a four-step RACH procedure, wherein the PRACH message includes a request for PUSCH repetition corresponding to a radio resource control (RRC) connection request message of the four-step RACH procedure; and transmitting at least one PUSCH repetition associated with the RRC connection request message based at least in part on the request.

25. A method of wireless communication performed by a network entity, comprising:

transmitting an indication of a physical uplink shared channel (PUSCH) request configuration that indicates one or more subsets of a plurality of physical random access channel (PRACH) occasions from which a PRACH message is to be transmitted, the indication being received in system information that comprises a system information block;

receiving the PRACH message corresponding to the one or more subsets of the PRACH occasions, wherein the one or more subsets of the PRACH occasions comprises a dedicated PRACH occasion comprising at least one shared PRACH occasion associated with a two-step random access channel (RACH) procedure and a four-step RACH procedure, wherein the PRACH message includes a request for PUSCH repetition corresponding to a radio resource control (RRC) connection request message of the four-step RACH procedure; and receiving at least one PUSCH repetition associated with the RRC connection request message based at least in part on the request.

26. The method of claim 24, wherein the one or more subsets include at least one of:

a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

27. The method of claim 24, wherein the PRACH message comprises a PRACH preamble associated with a set of preambles configured only in the plurality of PRACH occasions, and wherein the plurality of PRACH occasions are associated with the four-step RACH procedure, and wherein the plurality of PRACH occasions are configured with one or more PRACH preambles that are not used for requesting repetition of the RRC connection request message.

28. The method of claim 27, wherein the one or more processors are further configured to transmit an additional PRACH message corresponding to an additional PRACH occasion, wherein the additional PRACH occasion is selected from a subset of the plurality of PRACH occasions, and wherein all of the PRACH occasions in the subset are associated with only the four-step RACH procedure.

29. The method of claim 27, wherein the one or more processors are further configured to transmit an additional PRACH message corresponding to an additional PRACH occasion, wherein the additional PRACH occasion is selected from a subset of the plurality of PRACH occasions, and wherein the subset comprises the at least one shared PRACH occasion.

30. The method of claim 25, wherein the one or more subsets include at least one of:

a first subset of the plurality of PRACH occasions, wherein all of the PRACH occasions in the first subset are associated with only the four-step RACH procedure, a second subset of the plurality of PRACH occasions, wherein all of the PRACH occasions in the second subset are associated with only the two-step RACH procedure, or a third subset of the plurality of PRACH occasions, wherein the third subset comprises the at least one shared PRACH occasion.

* * * * *